United States Patent [19]

Leinen

[11] Patent Number: 4,819,543
[45] Date of Patent: Apr. 11, 1989

[54] ELECTRIC AND PNEUMATIC FEEDBACK CONTROLLED POSITIONER

[75] Inventor: Chris M. Leinen, Houston, Tex.
[73] Assignee: Topworks, Inc., Houston, Tex.
[21] Appl. No.: 113,010
[22] Filed: Oct. 23, 1987
[51] Int. Cl.$^4$ .............................................. F15B 9/03
[52] U.S. Cl. .................................... 91/363 R; 91/465
[58] Field of Search ...................... 91/361, 362, 363 R, 91/465, 358 R, 459

[56] References Cited

U.S. PATENT DOCUMENTS

| | | |
|---|---|---|
| 3,003,475 | 10/1961 | Rouvalis . |
| 3,087,468 | 4/1963 | Roberts et al. . |
| 3,095,785 | 7/1963 | Cahill . |
| 3,313,212 | 4/1967 | Baker et al. . |
| 3,552,271 | 1/1971 | Suggs ..................................... 91/361 |
| 3,896,914 | 7/1975 | Konsbruck et al. . |
| 4,077,738 | 3/1978 | Keely et al. . |
| 4,106,390 | 8/1978 | Kodaira et al. . |
| 4,121,618 | 10/1978 | Sweeney . |
| 4,358,989 | 11/1982 | Tordenmalm . |
| 4,513,782 | 4/1985 | Contartese et al. ............... 91/361 X |
| 4,712,470 | 12/1987 | Schmitz ................................. 91/361 |

OTHER PUBLICATIONS

Eckardt Pneumatic Positioner SRP 981 brochure, p. 1–22, Jan. 1984.
Conameter Corp., Series 42 Actaire pneumatic positioner data sheet, 12/84.

Primary Examiner—Edward K. Look
Attorney, Agent, or Firm—Pravel, Gambrell, Hewitt, Kimball & Krieger

[57] ABSTRACT

A control force input system for a balance beam or pivot arm pneumatic positioner which does not allow the controlled apparatus to make a full travel motion when the overall control signal is removed. The control force is transmitted to the balance beam by the coupling of the magnetic fields produced by a fixed magnet located on the balance beam and a variable magnet located away from the balance beam. When the motive control signal is removed from the variable magnet, the balance beam returns to an equilibrium or zero position due to the action of a pair of zero springs, stopping the controlled apparatus at its position when the control signal is removed.

20 Claims, 5 Drawing Sheets

ELECTRIC AND PNEUMATIC FEEDBACK CONTROLLED POSITIONER

BACKGROUND OF THE INVENTION

1. Field of the Invention

The present invention relates to an apparatus for actuating a process control element using pneumatic and electrical means.

2. Description of the Prior Art

U.S. Pat. Nos. 3,087,468 and 3,313,212 disclosed pneumatic and magnetic-pneumatic control systems for actuating valves and other apparatus. Both patents utilized pneumatic relays and a balance beam assembly to supply air pressure to a piston located in a cylinder. Unbalancing the beam caused air pressure to be supplied to one side of the piston and removed from the other side of the piston so that the piston moved. The piston was coupled to the balance beam by a spring so that as the piston moved, the balance beam received a force in a counterbalancing direction, forming the feedback necessary to allow the piston to balance at a given location. This movement of the piston and a shaft connected to the piston caused the valve to move as requested by a control input.

The initial imbalance or control signal was provided in U.S. Pat. No. 3,087,468 by a pneumatic bellows assembly appropriately coupled to the beam so that expanding or contracting the bellows caused the balance beam to pivot. The beam became balanced when the piston had moved sufficiently so that the force provided by the spring connected to the piston balanced the force provided by the bellows.

In U.S. Pat. No. 3,313,212 the imbalancing force was provided by a magnetic means using a permanent magnet attached to the balance beam and a coil located near the permanent magnet so that a current in the coil caused a magnetic force between the permanent magnet and the coil. This magnetic force caused the beam to pivot, with balance being restored when the piston spring force balanced the magnetic force being applied.

While the systems performed adequately under ordinary operating conditions, when the control source was removed, in U.S. Pat. No. 3,087,468, when the instrument supply air to the bellows was removed or in U.S. Pat. No. 3,313,212, when the coil current was removed, the actuators caused the piston to travel to full stroke in either the open or closed direction, depending upon configuration and pneumatic connections. This was an undesirable situation because this resulted in reduced control of the system, often when control was critical.

U.S. Pat. No. 3,896,914 disclosed a pneumatic system used to activate a lever used to select the direction of travel of a vehicle. Feedback of the actuator location was performed by a series of discrete position sensing switches. The switch states were combined with the desired vehicle direction signals to energize the desired number of position solenoid valves to allow pressurized air to move the actuator. While U.S. Pat. No. 3,896,914 disclosed the use of discrete position feedback and the use of solenoid valves for positioning an actuator, this technique is not practically usable with a balance beam or pivot arm based pneumatically controlled system because the system needs to be able to be positioned at any location within the full travel range, which would require an impractically large number of discrete position sensing switches. Additionally, the use of solenoid valves does not allow the actuator speed to be proportional to the distance from the desired location. The solenoid valve is a digital device which allows pneumatic flow at only one rate, so that the actuator travel is at an approximately constant speed.

SUMMARY OF THE INVENTION

The present invention provides an apparatus wherein the termination or removal of the control input or signal does not result in the piston making a full travel motion, but causes the piston to remain at the location existing prior to the termination of the control signal. The present invention allows setting the positioner at any location along its full travel. Additionally, the present invention allows the actuator travel rate to be proportional to the distance from the desired location. In the present invention, the imbalancing or control force is provided by a magnetic couple system. A fixed magnet is located on a balance beam or pivot arm connected to pneumatic relays. A variable magnet or magnets are located adjacent the fixed magnet and have fixed locations. The variable magnet produces a variable orientation and strength magnetic field, so that the fixed magnet is either attracted to or repelled from the variable magnet, depending on the necessary direction of travel and the distance from the desired location. The magnetic force causes the balance beam or pivot arm to pivot, thereby activating the proper pneumatic relays to move the actuator in the desired direction. The location of the actuator is provided by an electronic signal capable of resolving the actuator position into sufficient values for setting the actuator at effectively all of its possible locations. The location feedback signal is compared with a desired positional signal provided to the apparatus and the variable magnet is energized accordingly.

If the electrical power to the circuitry is removed, the force generated by the variable magnet ceases and the balance beam or lever arm returns to an equilibrium position by action of a pair of zero position springs. Therefore, if the electrical power is lost to the actuator system, the actuator position is fixed in the current position and the actuator does not move to a full travel position. This means that the valve or other device being actuated is maintained at the position selected prior to termination of the electrical power to the actuator, in many cases a more desirable condition than either the fully open or fully closed positions. Such operation thus avoids the problem of completely closing down the fluid flow to an operating system connected therewith, or alternatively supplying excessive fluid flow in the fully open position, either condition of which can be disastrous, especially if the correction is delayed for a substantial period of time. By leaving the system operating at the condition it is in when the malfunction occurs, both of the two extreme conditions are avoided, and normally, there would be no adverse effect under such condition.

DESCRIPTION OF THE ALTERNATE EMBODIMENTS

Figure 1:
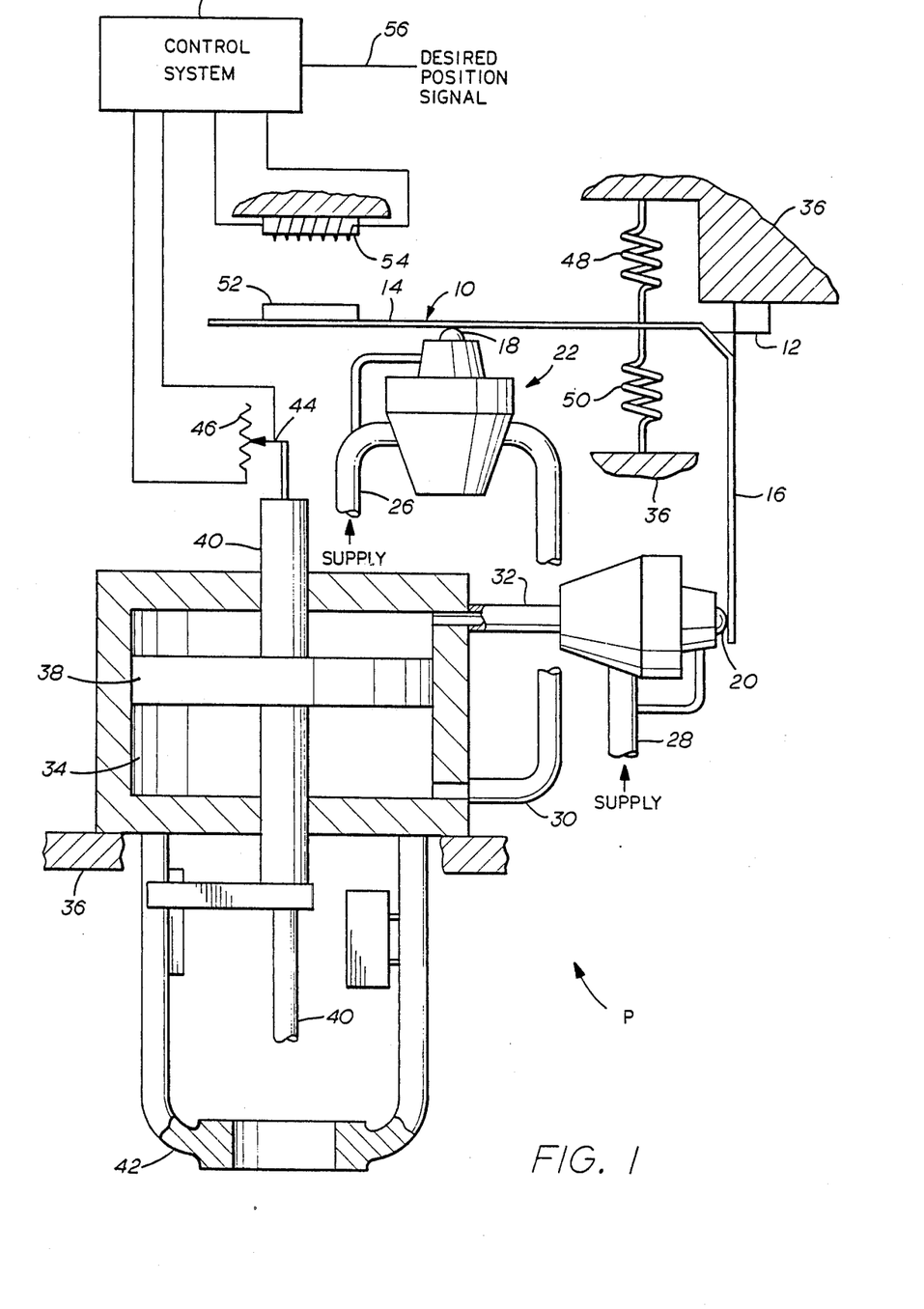
FIG. 1 is a schematic view of a positioner according to the present invention.

Referring to FIG. 1, the letter P generally refers to an electrical and pneumatic positioner according to the present invention. The positioner P includes a balance beam 10 which pivots at a pivot element 12 and has two arms 14, 16. A pair of pneumatic relays 22, 24 are used in conjunction with the balance beam 10 as the relays used control the air supply used to drive a piston 38 located in a cylinder 34. The piston 38 provides the motion used in actuating the operating device, which is commonly a valve.

The pneumatic relays 22, 24 receive a supply of air through supply ports 26, 28. The pneumatic relays 22, 24 have nozzles 18, 20 which contact the balance beam 10 to control the supply of air to the cylinder 34. The relays 22, 24 have an output port 30, 32 which can be connected either to the pneumatic supply 26, 28 or to a vent port depending upon the position of the balance beam 10 in relation to the nozzles 18, 20. The relays are connected to two ports of the cylinder 34, one relay 22 having its output port 30 connected below the piston 38 and the other relay 24 having its output port 32 connected above the piston 38.

In one preferred embodiment, with the balance beam 10 located away from the nozzle 18 of pneumatic relay 22, the output port 30 is connected to the vent. The location of the other relay 24 is such that under these conditions its nozzle 20 is closed by the balance beam arm 16 and the air supply 28 is connected to the output port 32. In this way the piston travels downwardly in the cylinder 34 because of a positive pressure above the piston 38 and a vent connection below the piston 38. A shaft 40 connected to the piston 38 causes the attached valve or other mechanism to travel. The shaft 40 is connected to the variable element or arm 44 of a potentiometer or variable resistor 46 so that as the shaft 40 moves the resistance of the variable resistor 46 changes to indicate shaft position.

A zero set condition, wherein the piston 38 motion is stopped is established using zero springs 48 and 50 attached to the fixed structure 36 of the positioner P and to the balance beam 10. Appropriately adjusting the zero springs 48, 50 sets the zero position of the balance beam 10 so that no motion of the piston 38 occurs when there is no control force input to the balance beam 10 because the balance beam 10 is equidistant from the relays 22, 24, inhibiting their action.

A control input is used to cause the piston 38 to move as desired. This control input is transferred to the balance beam 10 by means of a magnetic field. A fixed magnet 52, either permanent or constant field electromagnetic, is attached to one arm 14 of the balance beam 10. The fixed magnet 52 is located adjacent a variable magnet 54 whose field strength and polarity is controlled based on the motion of the shaft 40 which is desired. A higher strength field results in a greater speed of travel of the shaft 40 because the balance beam 10 is moved a greater distance, causing one pneumatic relay to open more and one pneumatic relay to shut more, until the maximum rate is established. The higher strength field moves the balance beam 10 more because there is a greater attractive or repulsive force to overcome the forces applied by the zero springs 48, 50. The polarity of the variable magnet 54 is used to determine the direction of the motion of the shaft 40, one polarity causing the shaft 40 to move in a first direction because of the attraction between the magnets 52, 54, while the second polarity causes the shaft 40 to move in a second direction because of the repulsion of the magnets 52, 54 and resulting opposite action of the pneumatic relays 22, 24. In an alternative embodiment, the fixed magnet 52 is a portion of the balance beam 10.

A desired position signal 56 is provided to a control system generally referred to by the letter C. The control system C determines the location of the shaft 40 by determining the resistance of the variable resistor 46. The shaft position is then compared against the desired position, at which time a current having the appropriate polarity and amplitude is provided to the variable magnet 54 to cause the shaft 40 to move the desired position. The position of the shaft 40 is monitored until the shaft 40 is at the desired position at which time the variable magnet 40 is deenergized and the balance beam 10 returned to the zero position, causing the shaft motion to stop.

Figure 2:
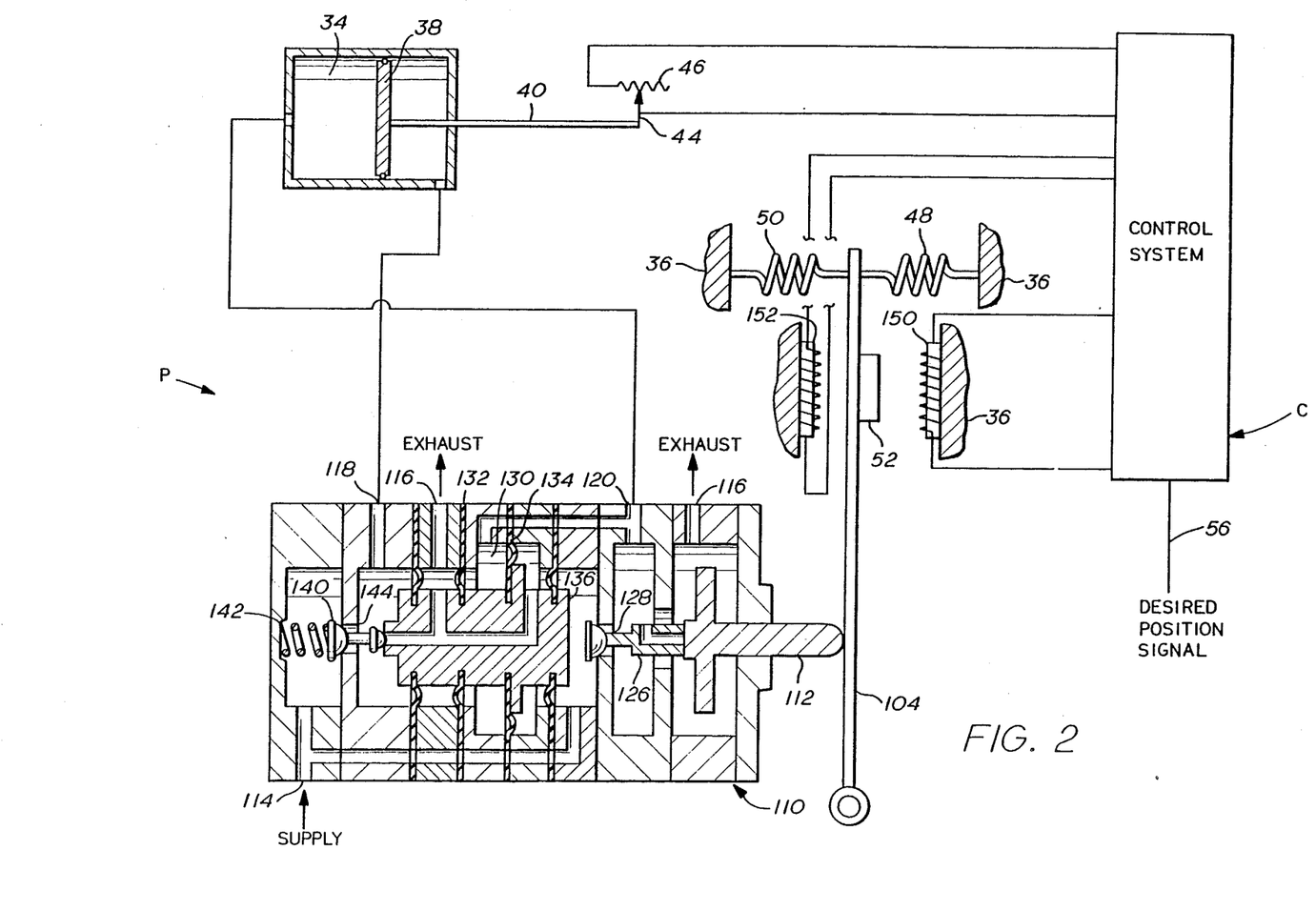
FIG. 2 is a schematic illustration of an alternative positioner according to the present invention.

An alternate embodiment of the valve positioner P is shown in FIG. 2. In this embodiment two separate variable magnets 150 and 152 are coupled to the fixed magnet 52 to provide the force used to cause the positioner P to move the shaft 40. When two variable magnets are used the fixed magnet 52 can be replaced by any magnetic material, such as iron, so that the material is attracted to the appropriate variable magnet. The zero springs 48, 50 are connected to a pivot arm 104. The pivot arm 104 has the fixed magnet 52 attached or incorporated and contacts a follower 112 used to control the operation of a pneumatic relay block 110.

The relay block 110 is supplied with air pressure to the supply port 114 and has exhaust ports 116 and output ports 118 and 120. The output ports 118, 120 are connected to the upper and lower portions of a cylinder 34 as desired for direct action or reverse action of the positioner P.

Operation of the positioner P shown in FIG. 2 is as follows. One variable magnet 152 is energized so that the pivot arm 104 is moved toward the relay block 110. This causes the follower 112 to move a direct pilot valve 126 so that a direct pilot port 128 is opened, allowing pressure to be transmitted from the supply port 114 to the outlet port 120. This pressure supplied to the outlet port 120 in turn pressurizes a central chamber 130 located between two diaphragms 132 and 134. The pressure in the central chamber 130 moves a reverse pilot control block 136 away from a reverse pilot valve 140. This movement of the control block 136 connects the outlet port 118 to the exhaust port 116, reducing pressure on the opposite side of the piston 38 so that the piston 38 can travel. The travel of the piston 38 causes the shaft 40 to move, which in turn is coupled to the variable resistor arm 44, changing the resistance of the variable resistor 46. The resistance is monitored by the control system C, which appropriately varies the magnetic field of the variable magnet 152 to smoothly start and stop the shaft movement.

If the piston 38 is desired to be moved in the opposite direction from the previous example, the other variable magnet 150 is energized and the pivot arm 104 is moved away from the follower 112. This movement of the pivot arm 104 allows the follower 112 to move away from the direct pilot valve 126 which in turn couples the outlet port 120 to the exhaust port 116 so that a portion of the cylinder 34 is being vented. The exhaust port 116 is also coupled to the central chamber 130 so that a reduced pressure appears in the central chamber 130. This reduced pressure causes the reverse pilot control block 136 to exert a force on the reverse pilot valve 140 and compress a reverse pilot spring 142. The movement of the reverse pilot valve 140 opens a reverse pilot port 144, thereby allowing the air supply port 114 to be connected to the outlet port 118. In this way, supply pressure is connected to the opposite side of the piston 38 and the piston 38 therefore travels inside the cylinder 34. This travel of the piston 38 continues until the pivot arm 104 is returned to the zero position to stop piston travel.

It can be seen that should power to the variable magnets 54, 150 or 152 be removed, in any embodiment, the positioner P would stop movement of the piston 38 at its position at that time because the airflow to and from the cylinder 34 would be stopped, stopping piston 38 movement. Therefore, if the control signal is lost the piston 38 does not travel to a full travel position in the cylinder 34, but remains at the position in its travel where the signal was lost.

This characteristic of remaining at the current position is more desirable in many control situations because this eliminates the addition of an additional error signal into the environment and thereby lessens the required responses. Maintaining the valve positioner at its current position also allows a partially operational condition to occur. For example, if the valve positioner is operating a valve on a gas pipeline spur which feeds a city and the positioner loses the control signal, a full travel condition would either shut off the gas to the city, or increase the flow to the city, thereby disrupting overall pressure and flow conditions on the pipeline. By remaining in the current position, the valve positioner of the present invention prevents either of these developments and keeps gas flow and pressure at the rate previously used, resulting in fewer problems for both the city and the pipeline operators.

Alternate embodiments of the positioner P of the present invention can be used with piston and spring actuator assemblies, vane actuators, pneumatic motors, or other actuators as appreciated by those skilled in the art.

An embodiment of the positioner P used in conjunction with a piston and spring actuator has only a single outlet port which is coupled to the pneumatic portion of the cylinder. Pneumatic pressure is applied to only one side of the piston in the cylinder, with the spring providing the opposing force. By coupling the output port of a pneumatic supply the pressure in the cylinder increases, moving the piston against the resisting force of the spring. When the output port is coupled to a vent, the pressure in the cylinder is reduced and the piston is moved by the spring.

An embodiment of the positioner P used in conjunction with a vane actuator is similar to the above piston in cylinder examples, except that the vane pivots instead of the piston traveling in cylinder. The vane is appropriately coupled to the positioner P to provide positional information.

An embodiment of the positioner P utilized with a pneumatic motor has two outlet ports, each connectable to a pneumatic supply. The pneumatic motor inlet ports to allow the motor to rotate in two directions. Coupling the appropriate positioner outlet port to the motor causes the motor to rotate. The rotation of the motor is coupled to the positioner P by an appropriate variably resistive element, for example a multi-turn potentiometer, as necessary to indicate the position of the motor.

Figure 3:
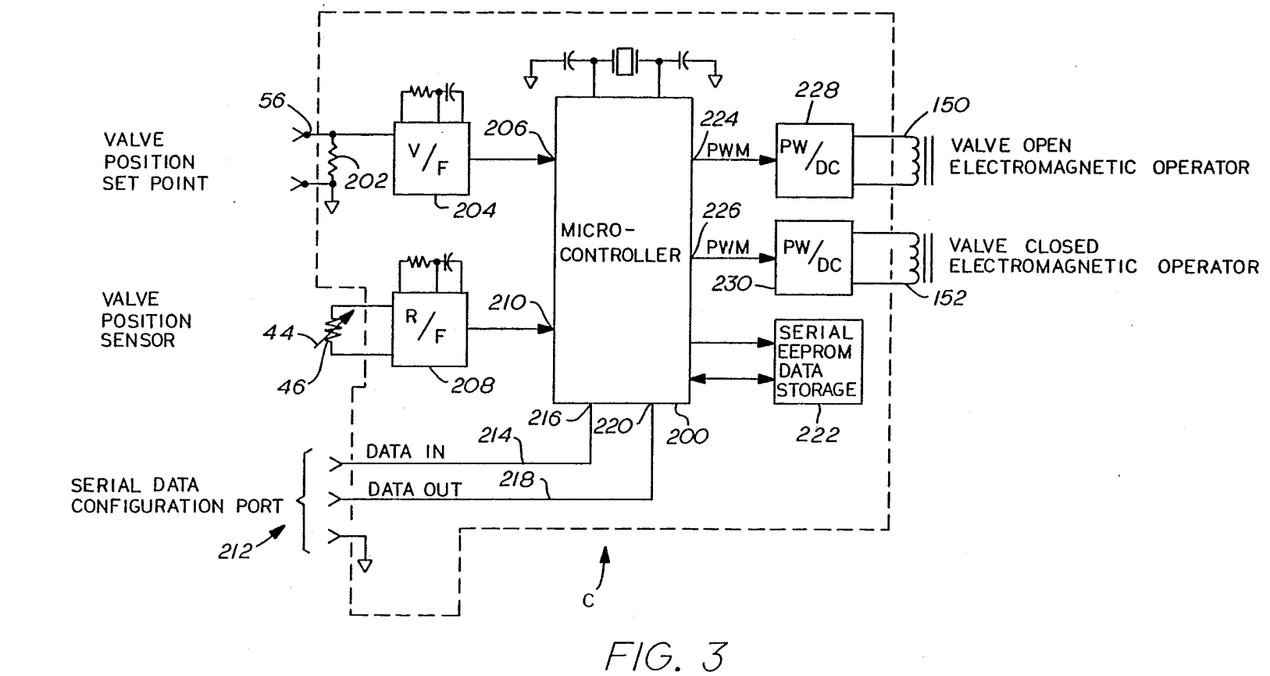
FIG. 3 is an electrical block diagram of a control system for use with a positioner according to the present invention.

In the preferred embodiment, the control system C utilizes a microcontroller 200 (FIG. 3). The microcontroller 200 is a standard microprocessor unit which contains various types of memories, various selectable input and output ports and preferably a serial data port. The use of the microcontroller 200 allows a great deal of intelligence and flexibility to be developed in the control system C at a relatively low cost. The desired position signal or valve position set point 56 is commonly a 4-20 mA signal in industrial control applications and is provided to a terminating resistor 202. This terminating resistor 202 is connected to a voltage to frequency converter 204 whose output is connected to a frequency input 206 of the microcontroller 200. The valve position sensor or variable resistor 46 is connected to a resistance to frequency converter 208 whose output is connected to a second frequency input 210 of the microcontroller 200. The resolution of the converters 204, 208 is sufficient to allow the actuator or valve to be positioned at effectively any location within the range of the actuator.

The frequency inputs 206 and 210 could be, for instance, capture latch inputs on the microcontroller 200 so that the count of a free-running timer contained in the microcontroller 200 is captured when the frequency input changes states, thus allowing a simple and easy calculation to determine the frequency and therefore actual value of the analog or resistance signal being measured.

The control system C preferably includes a serial data configuration port 212 having a data in line 214 connected to a serial data input 216 of the microcontroller 200 and a data out line 218 connected to a serial data output 220 of the microcontroller 200. This use of the serial data port 212 allows the microcontroller 200 to communicate with a host computer (not shown) for transmission of calibration data and digital valve position control. The calibration data preferably includes information used to match the flow curve of the valve to the valve's physical characteristics, for instance, to match quick opening, linear or other valve types with the appropriate flow. For example, a valve could be at one-half flow rate and yet only be physically one-third open, so data transmitted from the host computer and received by the microcontroller 200 is used to indicate this condition and therefore appropriately transform the desired valve position set point information signal 56 to actual physical valve opening information, allowing flow rates to be specified rather than opening percentages. Additionally, the serial port 212 allows the host computer to transmit actual valve position information to the microcontroller 200, thereby removing the need for the desired position signal 56 and its associated voltage to frequency converter 204. The calibration data is preferably stored in a non-volatile memory 222 so that the information is not required to be gathered from the host computer each time the control system C loses its power supply.

Data can be returned from the microcontroller 200 to the host computer as desired. This information includes the transmission of the actual valve position, the actual desired set position, the calibration curves as presently stored in the control system C, any error flags that have occured during operation of the control system C and any other data present or accessible to the microcontroller 200. This information is used by the host computer in error analysis to help solve problems that occur.

The variable magnets 150, 152 are preferably controlled by the microcontroller 200 using pulse width modulated outputs 224, 226 which are provided to pulse width modulation to DC converters 228, 230. By appropriately varying the pulse width modulated signal being presented to the converter 228, 230, the microcontroller 200 can adjust the strength of the magnetic field developed by the variable magnets 150, 152 and thereby the amount of travel of the pivot arm 104.

Figure 4A:
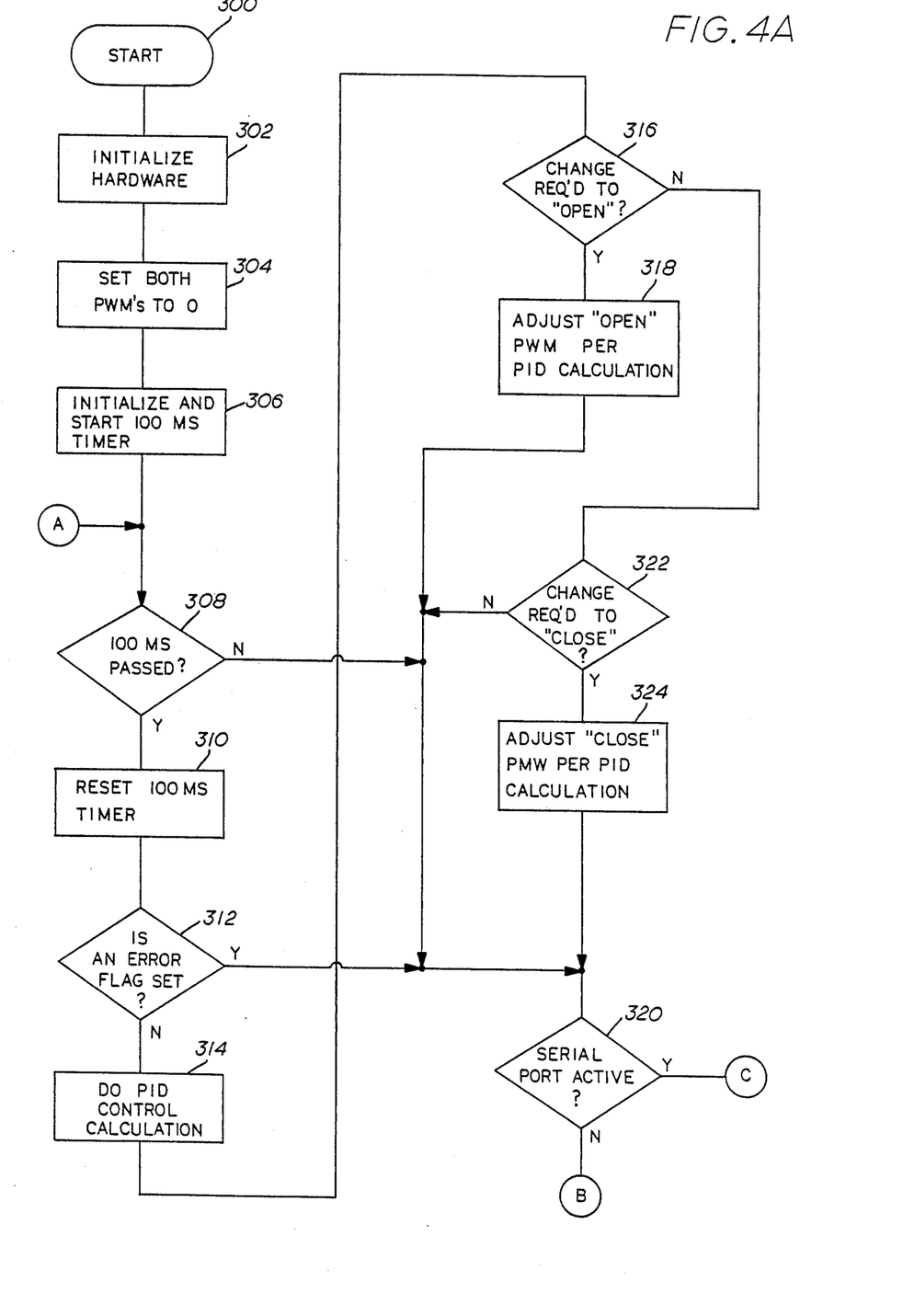
FIGS. 4A and 4B are flowchart illustrations of a sequence of operations for operating the control system of FIG. 3 according to the present invention.
Figure 4B:
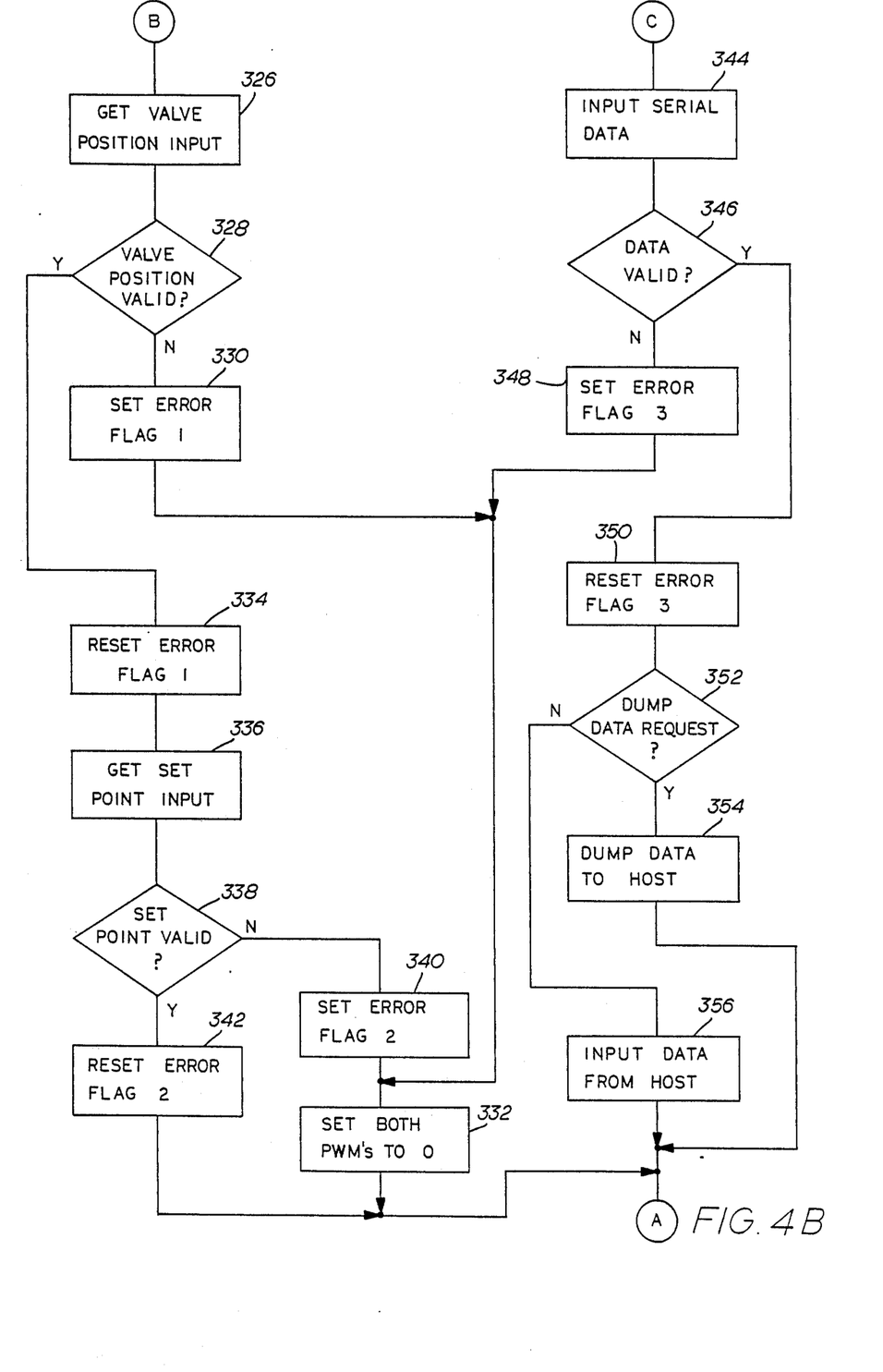

The microcontroller 200 performs a series of functions or instructions to control its operation (FIGS. 4A and 4B). The instructions of program 300 are commenced by initializing the hardware used in the control system C in step 302. In this step 302, the microcontroller 200 starts any required timers and appropriately changes or sets any output or input ports as desired and reads calibration data from the non-volatile memory 222. After completing initialization, control is transferred to step 304 where the microcontroller 200 sets both pulse width modulated outputs to a zero value so that both of the variable magnets 150, 152 are deenergized and the pivot arm 104 is in the zero position. After the pulse width modulated outputs have been set to zero, the operation of the microcontroller 200 proceeds to step 306 where a 100 millisecond timer loop is initialized and commenced. The 100 millisecond timer is used as the minimum time between the calculations used to position the positioner P.

After the timer has been started in step 306, control is passed to step 308 where the microcontroller 200 determines if the 100 millisecond interval has been completed. If the 100 millisecond interval has been completed, control proceeds to step 310 where the 100 millisecond timer is reset to reinitiate a timing loop and control is passed to step 312 where the microcontroller 200 determines whether an error flag has been set in previous loops through the instruction sequence. If an error flag was not set, step 312 passes control to step 314 where the microcontroller 200 performs a proportional integral derivative control calculation to determine the appropriate motion of the actuator. The proportional integral derivative control calculation is a calculation known to those skilled in the art and no further explanation is deemed necessary. The output of the calculation indicates the direction needed for the actuator to travel and the desired strength of the variable magnetic fields to cause the actuator to move at the desired rate. After performing the proportional integral derivative calculation in step 314, control proceeds to step 316 where the microcontroller 200 determines if a change in the pulse width modulated outputs is necessary to open the actuator. If a change is necessary, control proceeds to step 318 where the pulse width modulated outputs 224, 226 are appropriately adjusted to change the opening variable magnet 150 according to the results of the proportional integral derivative calculation. After the pulse width modulated signals have been appropriately adjusted in step 318, control is transferred to step 320.

If no change was required to open the actuator in step 316, control transfers to step 322 where the microcontroller 200 determines whether a change is required to close the actuator. If no change is required to close the actuator and therefore the pulse width modulated outputs are correct as currently existing, control transfers to step 320. If a change in the pulse width modulated outputs is necessary to close the actuator, control transfers to step 324 where the microcontroller 200 appropriately adjusts the pulse width modulated outputs 224, 226 to close the actuator as desired by the proportional integral derivative calculation performed in step 314. After this adjustment is performed in step 324, control is transferred to step 320.

If the 100 millisecond interval has not yet passed, step 308 transfers control to step 320. If an error flag is set as determined in step 312, control is transferred from step 312 to step 320, thereby bypassing any calculations relating to the actuator position, the pulse with modulated outputs remaining at their current output state.

In step 320, the microcontroller 200 determines whether the serial port 212 is active, indicating that the host computer is either sending information to the microcontroller 200 or requesting information from the microcontroller 200.

If the serial port is not active, step 320 transfers control to step 326 where the microcontroller 200 determines the actual actuator or valve position. In the next step, step 328, the microcontroller 200 determines whether the valve position data is valid or whether the data indicates that the valve is in undefined location or has made a discontinuous jump in position. If the data is not valid, control proceeds to step 330 where a first error flag is set by the microcontroller 200. After the error flag is set in 330, control is transferred to step 332 where the microcontroller 200 sets both pulse width modulated outputs to zero, thereby stopping the movement of the actuator at that position because the pivot arm 104 returns to the zero position and air movement into and out of the cylinder 34 is stopped. After the pulse width modulated outputs have been set to zero in step 332, control is returned to step 308 to determine if the 100 millisecond interval has passed.

If the valve position as determined in step 326 is valid, step 328 transfers control to step 334 where the first error flag is reset. The microcontroller 200 then determines the valve position set point information or desired position signal 56 value in step 336. After this value is determined in step 336, control proceeds to step 338 where the microcontroller 200 determines whether the set point value is valid. If the set point value is not valid, control proceeds to step 340 where a second error flag is set. After the second error flag is set, control proceeds to step 332 where the pulse width modulated outputs are set to zero, at which time control proceeds to step 308.

If the set point information was valid as determined in step 338, control proceeds to step 342 where the second error flag is reset, following which control is returned to step 308.

If the microcontroller 200 determines in step 320 that the serial port 212 is active, control proceeds to step 344 where the serial data is received by the microcontroller 200. This data is then analyzed in step 346 to determine if it is valid data. If the data is not valid, in step 348 the microcontroller 200 sets a third error flag and control proceeds to step 332. If the data is valid as determined in step 346, control proceeds to step 350 where the third error flag is reset. After resetting the third error flag, the microcontroller 200 proceeds to step 352 where it evaluates the serial data received to determine if this is a request from the host computer to dump data contained in the microcontroller 200 or to receive data from the host. If it is a dump data request, control proceeds to step 354 where the requested data is transmitted to the host computer over the serial port 212. If it is a request to receive data from the host, control proceeds from step 352 to step 356 where the input data is received from the host and appropriately stored in the microcontroller 200 and in the non-volatile memory 222. After either dumping data in step 354 or inputting data in step 356, control returns to step 308 to determine if the 100 millisecond interval has passed and it is time to perform the next iteration in the proportional integral differential control loop.

While in the preferred embodiment of the control system C has been described as being based on the microcontroller 200, it is understood that the control system C could also be based on discrete digital components, discrete analog components or a combination thereof.

The foregoing disclosure and description of the invention are illustrative and explanatory thereof, and various changes in the size, shape and materials as well as in the details of the illustrated construction may be made without departing from the spirit of the invention, all such changes being contemplated to fall within the scope of the appended claims.

What is claimed:

1. A control element positioning apparatus activated by an external control signal and utilizing electrical energy, comprising:
    a balance beam, said balance beam being coupled to a pivot element;
    a pair of pneumatic force balance elements each having an air nozzle, the nozzle of each force balance element being disposed adjacent to said balance beam and positioned whereby movement of said balance beam towards one nozzle moves said balance beam away from the other nozzle, each of said force balance elements having a pneumatic output element;
    a cylinder, said cylinder having a piston disposed therein, said piston being coupled to a shaft;
    each of said pneumatic output elements being coupled to an end of said cylinder;
    magnetic material means located on said balance beam;
    variable magnet means operating on electrical energy located adjacent said balance beam magnetic means for producing a varying magnetic field for developing a varying force between said variable magnet means and said balance beam magnetic material means, said variable magnet means producing the magnetic field only while supplied with electrical energy;
    zero bias means coupled to said balance beam for biasing said balance beam equidistant from each nozzle in the absence of a magnetic field produced by said variable magnet means;
    means for producing a signal indicative of said piston position; and
    means for controlling the magnetic field produced by said variable magnet means responsive to the external control signal and said piston position signal to move said piston to the desired position.

2. The apparatus of claim 1, wherein said piston position signal means comprises a variable resister coupled to said shaft.

3. The apparatus of claim 1, wherein said zero bias means comprises a pair of springs coupled to said balance beam.

4. The apparatus of claim 1, wherein said balance beam magnetic material means comprises a permanent magnet.

5. The apparatus of claim 1, wherein said variable magnet means comprises an electromagnet.

6. A control element positioning apparatus for positioning a piston in a cylinder to a desired position based on an external control signal, the cylinder having inlet ports at both ends and the piston being coupled to a shaft and the apparatus being coupled to a pneumatic supply and an exhaust and utilizing electrical energy, comprising:
    a pivot arm, said pivot arm being coupled to a pivot element;
    a pneumatic force balance element having pneumatic output elements and being coupled to said pivot arm so that when said pivot arm moves in a first direction a first pneumatic output element is coupled to a pneumatic supply and a second pneumatic output element is coupled to an exhaust and when said pivot arm moves in a second direction, the first pneumatic output element is coupled to an exhaust and the second pneumatic output element is coupled to a pneumatic supply;
    each of said pneumatic output elements being adapted to be coupled to an end of the cylinder;
    magnetic material means located on said pivot arm;
    variable magnet means operating on electrical energy located adjacent said pivot arm magnetic means for producing a varying magnetic force for developing a varying force between said variable magnet means and said pivot arm magnetic material means, said variable magnet means producing the magnetic field only while supplied with electrical energy;
    zero bias means coupled to said pivot arm for biasing said pivot arm so that said pneumatic output elements are disconnected from the pneumatic supply and the exhaust in the absence of a magnetic field produced by said variable magnet means;
    means for producing a signal indicative of said piston position; and
    means for controlling the magnetic field produced by said variable magnet means responsive to the external control signal and said piston position signal to move said piston to the desired position.

7. The apparatus of claim 6, wherein said piston position signal means comprises a variable resister coupled to the shaft.

8. The apparatus of claim 6, wherein said zero bias means comprises a pair of springs coupled to said pivot arm.

9. The apparatus of claim 6, wherein said pivot arm magnetic material means comprises a permanent magnet.

10. The apparatus of claim 6, wherein said variable magnet means comprises an electromagnet.

11. The apparatus of claim 6, wherein said variable magnet means comprises two electromagnets.

12. The apparatus of claim 11, wherein said pivot arm magnetic material means is comprised of iron.

13. A positioning apparatus for positioning an actuator based on an external control signal; the actuator being adapted to move bidirectionally, being responsive to pneumatic pressures and providing means for indicating the position of the actuator; and the apparatus being coupled to a pneumatic pressure source and a pneumatic pressure vent and utilizing electrical energy, comprising:
- means for summing a plurality of applied forces and being adapted for motion in response to an imbalance of the applied forces;
- pneumatic pressure control means for coupling the pneumatic pressure source and the pneumatic pressure vent to the actuator, said pressure control means being coupled to said summing means, to the actuator, to the pneumatic pressure source and to the pneumatic pressure vent, so that when said summing means moves in a first direction the pneumatic pressure source and the pneumatic pressure vent are coupled to the actuator to cause the actuator to move in one direction and when the summing means moves in a second direction the pneumatic pressure source and the pneumatic pressure vent are coupled to the actuator to cause the actuator to move in an opposite direction;
- magnetic material means located on said summing means;
- variable magnet means operating on electrical energy located adjacent said summing means magnetic material means for producing a varying magnetic field for producing a varying force between said variable magnet means and said summing means magnetic material means, said variable magnet means producing the magnetic field only while supplied with electrical energy;
- zero bias means for biasing said summing means to a position where said pneumatic pressure control means uncouples the pneumatic pressure source and the pneumatic pressure vent from the actuator in the absence of a magnetic field produced by said variable magnet means; and
- means for controlling the magnetic field produced by said variable magnet means in response to the external control signal and the actuator position to move the actuator to the desired position.

14. The apparatus of claim 13, wherein the actuator position indicating means comprises a variable resistor coupled to the actuator.

15. The apparatus of claim 13, wherein said zero bias means comprises a pair of springs coupled to said summing means.

16. The apparatus of claim 13, wherein said summing means magnetic material means comprises a permanent magnet.

17. The apparatus of claim 13, wherein said variable magnet means comprises an electromagnet.

18. The apparatus of claim 13, wherein said variable magnet means comprises two electromagnets.

19. The apparatus of claim 18, wherein said summing means magnetic material means is comprised of iron.

20. The apparatus of claim 13, wherein said summing means magnetic material means comprises a portion of said summing means.

* * * * *